US012725904B2

(12) United States Patent
Zhu et al.

(10) Patent No.: US 12,725,904 B2
(45) Date of Patent: Sep. 1, 2026

(54) LIQUID CRYSTAL ANTENNA AND MANUFACTURING METHOD THEREOF

(71) Applicant: Chengdu Tianma Micro-Electronics Co., Ltd., Chengdu (CN)

(72) Inventors: Qingsan Zhu, Chengdu (CN); Yifan Xing, Chengdu (CN); Baiquan Lin, Chengdu (CN); Kerui Xi, Chengdu (CN); Ping Su, Chengdu (CN); Ximin Qi, Chengdu (CN); Qiang Sun, Chengdu (CN); Jiayun Chen, Chengdu (CN); Yi Wang, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 84 days.

(21) Appl. No.: 18/795,450

(22) Filed: Aug. 6, 2024

(65) Prior Publication Data

US 2025/0112353 A1 Apr. 3, 2025

(30) Foreign Application Priority Data

Sep. 28, 2023 (CN) ......................... 202311287801.6

(51) Int. Cl.
*H01Q 1/12* (2006.01)
*H01Q 1/36* (2006.01)

(52) U.S. Cl.
CPC ................. *H01Q 1/12* (2013.01); *H01Q 1/36* (2013.01)

(58) Field of Classification Search
CPC .. H01Q 1/12; H01Q 1/36; H01Q 1/22; H01Q 1/24; H01Q 3/36; H01Q 1/38; G02F 1/133305; G02F 1/134309
See application file for complete search history.

(56) References Cited

U.S. PATENT DOCUMENTS

| | | | | |
|---|---|---|---|---|
| 11,799,197 | B2 * | 10/2023 | Yang | H01Q 1/36 |
| 2021/0208472 | A1 * | 7/2021 | Liu | G02F 1/3544 |
| 2024/0063531 | A1 * | 2/2024 | Jia | H01Q 3/44 |
| 2024/0283150 | A1 * | 8/2024 | Cui | H01Q 3/36 |

FOREIGN PATENT DOCUMENTS

| | | | | |
|---|---|---|---|---|
| CN | 113725597 | A | 11/2021 | |
| CN | 114284714 | A | 4/2022 | |
| CN | 113871818 | B * | 7/2022 | H01P 11/00 |

* cited by examiner

*Primary Examiner* — Seung H Lee
(74) *Attorney, Agent, or Firm* — Anova Law Group, PLLC

(57) ABSTRACT

A liquid crystal antenna includes a first substrate, a second substrate oppositely arranged to the first substrate, a plurality of first conductive parts located over one side of the first substrate adjacent to the second substrate, a plurality of second conductive parts located over one side of the second substrate adjacent to the first substrate, a third substrate, a plurality of third conductive parts located over one side of the third substrate away from the second substrate, a liquid crystal layer, and a frame adhesive located between the first substrate and the second substrate. The third substrate is positioned over one side of the second substrate away from the first substrate, at least one side surface of the second substrate, and the side of the second substrate adjacent to the first substrate.

19 Claims, 12 Drawing Sheets

LIQUID CRYSTAL ANTENNA AND MANUFACTURING METHOD THEREOF

CROSS-REFERENCE TO RELATED APPLICATION

This application claims priority to Chinese Patent Application No. 202311287801.6, filed on Oct. 8, 2023, the entire content of which is incorporated herein by reference.

TECHNICAL FIELD

The present disclosure relates to the field of communication technology, specifically, to a liquid crystal antenna and a manufacturing method of the liquid crystal antenna.

BACKGROUND

A liquid crystal antenna is a novel array antenna made by combining a conventional patch antenna with a liquid crystal phase shifter. The liquid crystal phase shifter controls a deflection of a liquid crystal molecule to achieve phase modulation of a radio frequency signal. The liquid crystal antenna is widely used in satellite receiving antennas, automotive radars, base station antennas, and other fields.

The liquid crystal antenna includes a liquid crystal cell. The liquid crystal cell includes a first substrate and a second substrate that is oppositely arranged to the first substrate. A grounded metal layer is formed on a surface of the second substrate adjacent to the first substrate. A radiating electrode is formed on a surface of the second substrate away from the first substrate. Therefore, the patterning process needs to be completed on two opposing surfaces of the second substrate. In an actual production, the double-sided patterning process is difficult to implement. Therefore, in a conventional technology, through bonding a third substrate to the surface of the second substrate away from the first substrate, the radiating electrode is formed on a surface of the third substrate away from the second substrate to reduce the difficulty of preparing the liquid crystal antenna. However, due to the presence of the third substrate, a distance between the phase shifter electrode and the radiating electrode increases, and a dielectric constant of a medium between the phase shifter electrode and the radiating electrode also increases, which will decrease a radiation performance of the liquid crystal antenna.

There is an urgent need for a liquid crystal antenna that can address technical issues related to reduced radiation performance.

The above information disclosed in the background section is only for enhancing the understanding of the background of the technology described in the present disclosure. Therefore, the background may contain certain information that is not known in this country to a person of ordinary skill in the art.

SUMMARY

In accordance with the disclosure, there is provided a liquid crystal antenna including a first substrate, a second substrate, a plurality of first conductive parts, a plurality of second conductive parts, a third substrate, a plurality of third conductive parts, a liquid crystal layer, and a frame adhesive. The first substrate and the second substrate are oppositely arranged. The plurality of first conductive parts is located over one side of the first substrate adjacent to the second substrate. The plurality of second conductive parts is located over one side of the second substrate adjacent to the first substrate. The third substrate is located over one side of the second substrate away from the first substrate, at least one side surface of the second substrate, and one side of the second substrate adjacent to the first substrate. The plurality of third conductive parts is located over one side of the third substrate away from the second substrate. The frame adhesive is located between the first substrate and the second substrate, and forms an accommodation space with the first substrate and the second substrate. The liquid crystal layer is located within the accommodation space. The third substrate is a flexible substrate.

Also in accordance with the disclosure, there is provided a method of forming an liquid crystal antenna including providing a first substrate and forming a plurality of spaced first conductive parts over one surface of the first substrate, providing a second substrate and arranging a first flexible material layer over at least a portion of one surface of the second substrate, arranging a plurality of spaced third conductive parts over one surface of the first flexible material layer away from the second substrate; and arranging a plurality of spaced second conductive parts on one side of the second substrate adjacent to the first flexible material layer. The plurality of spaced third conductive parts is located over one side of the plurality of spaced second conductive parts. The method further includes cell-aligning the first substrate and the second substrate; arranging a liquid crystal layer between the second substrate and the first substrate; arranging a frame adhesive over one side of the liquid crystal layer; and forming an accommodation space by the frame adhesive, the first substrate, and the second substrate. The liquid crystal layer, a portion of the plurality of spaced first conductive parts, and the plurality of spaced second conductive parts are located in the accommodation space. The method also includes removing a portion of the second substrate located over one side of the frame adhesive away from the liquid crystal layer, exposing a portion of the first flexible material layer. An exposed first flexible material layer forms a second flexible material layer. The plurality of spaced third conductive parts is located on one surface of the second flexible material layer. The method also includes bending the second flexible material layer, making the second flexible material layer to be located at least over a first side surface of the second substrate and one side of the second substrate away from the first substrate. The first flexible material layer is located on the second substrate adjacent to the first substrate and the bent second flexible material layer forms a third substrate. The plurality of the third conductive parts is located over one side of the third substrate away from the second substrate.

BRIEF DESCRIPTION OF THE DRAWINGS

Descriptions and drawings that constitute a part of the present disclosure are used to provide a further understanding of the present disclosure. The illustrative embodiments and their descriptions of this application are used to explain the present disclosure and do not constitute an improper limitation of this application.

DETAILED DESCRIPTION OF THE EMBODIMENTS

Figure 1:
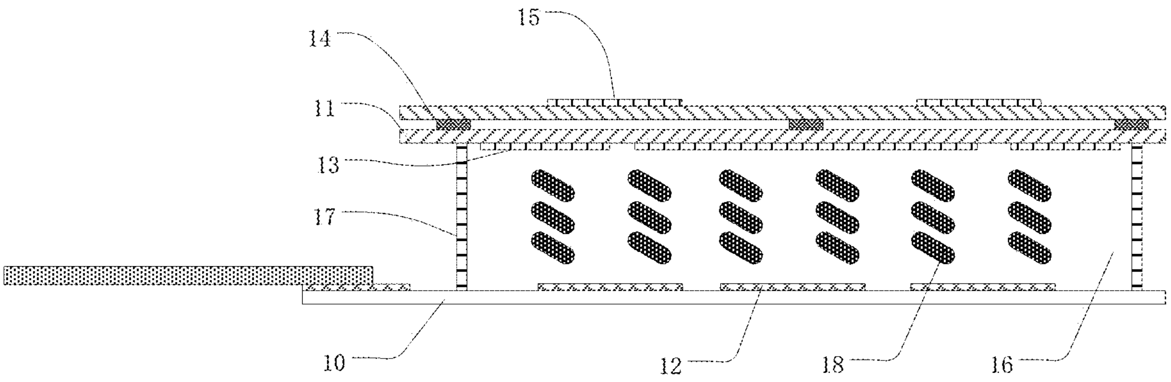
FIG. 1 illustrates a schematic structural diagram of a liquid crystal antenna.

It should be noted that the following detailed description is illustrative and is intended to provide further explanation of the present disclosure. Unless otherwise defined, all technical and scientific terms used herein have same meanings commonly understood by a person of ordinary skill in the art to which the present disclosure belongs.

It should be noted that the terms used herein are only for describing specific embodiments and are not intended to limit exemplary embodiments according to the present disclosure. As used herein, a singular form is also intended to include a plural form unless a context clearly indicates otherwise. Furthermore, it will be understood that when the terms "comprises" and/or "includes" are used in this specification, they indicate there are features, steps, operations, means, components, and/or combinations thereof.

It will be understood that when an element (such as a layer, film, region, or substrate) is referred to as being "on" another element, it can be directly on another element or an intermediate element may also be present. Furthermore, in the specification and claims, when an element is described as being "connected" to another element, it can be "directly connected" to another element or "connected" to another element through a third element.

It should be clear that the described embodiments are only some, but not all, of the embodiments of the present disclosure. Based on embodiments of the present disclosure, all other embodiments obtained by those persons of ordinary skill in the art without making creative efforts fall within the protection scope of the present disclosure.

It should be understood that the term "and/or" used in the present disclosure is only an association relationship describing related objects, indicating that there can be three relationships, for example, A and/or B, which can mean there are three situations: A exists alone, A and B exist simultaneously, and B exists alone. In addition, the character "/" in this article generally indicates that the related objects are an "or" relationship.

It should be understood that although the terms first, second, and third may be used to describe a substrate, a conductive part, and a part in embodiments of the present disclosure, the substrate, the conductive part, and the part should not be limited to these terms, and these terms are only used for distinguishing the substrate, the conductive part, and the part from each other. For example, without departing from the scope of embodiments of the present disclosure, a first substrate may also be called a second substrate, and similarly, a second conductive part may also be called a first conductive part.

A liquid crystal antenna in the present disclosure can be used as a GPS receiving antenna, and can also be applied to communication equipment. Due to its bendable characteristics, the liquid crystal antenna can also be applied to a curved surface in a specific scene, such as a vehicle (a headlight, a windshield, a car casing location, etc.), a building wall, an aircraft (fuselage, a wing), etc.

FIG. 1 is a schematic structural diagram of a liquid crystal antenna. As shown, the liquid crystal antenna includes a first substrate 10 and a second substrate 11 oppositely arranged to the first substrate 10. A second conductive part 13 is formed over one surface of the second substrate 11 adjacent to the first substrate 10. A third conductive part 15 is formed over one surface of the second substrate 11 away from the first substrate 10. Therefore, a patterning process needs to be completed over the two opposing surfaces of the second substrate 11. In actual production, double-sided patterning is difficult. Therefore, by laminating a third substrate 14 over the surface of the second substrate 11 away from the first substrate 10, the third conductive part 15 is formed over one surface of the third substrate 14 away from the second substrate 11, reducing the difficulty of preparing the liquid crystal antenna. The liquid crystal antenna also includes a liquid crystal layer 16 and a frame adhesive 17. The liquid crystal layer 16 is located between the second substrate 11 and the first substrate 10. A first conductive part 12 is provided over one surface of the first substrate 10 adjacent to the second substrate 11. The frame adhesive 17 is located between the first substrate 10 and the second substrate 11. Due to the presence of the third substrate 14, a distance between the first conductive part 12 and the third conductive part 15 increases, and a dielectric constant of a medium between the first conductive part 12 and the third conductive part 15 also increases, which may cause radiation performance of the liquid crystal antenna decrease. In addition, the third substrate is usually implemented using a glass substrate. However, when the third substrate is a glass substrate, its thickness is relatively large, which may lead to a large antenna loss.

Figure 2:
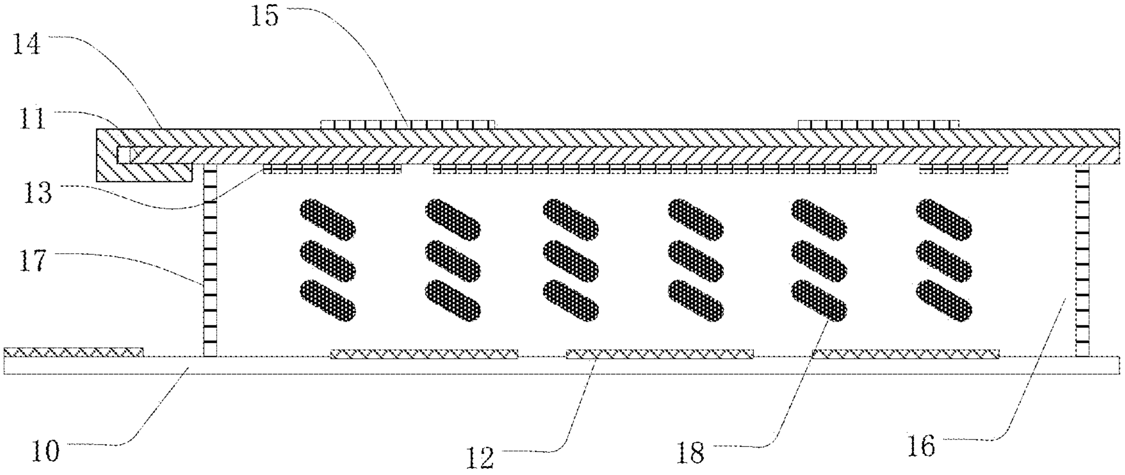
FIG. 2 illustrates a schematic structural diagram of an exemplary liquid crystal antenna according to one embodiment of the present disclosure.
Figure 3:
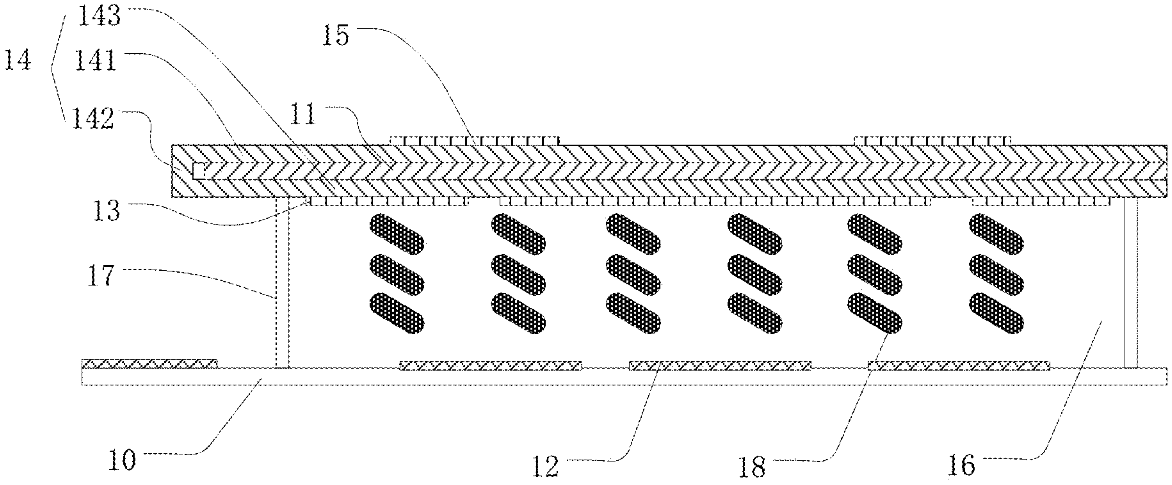
FIG. 3 illustrates a schematic structural diagram of another exemplary liquid crystal antenna according to one embodiment of the present disclosure.

In order to address the above issues, embodiments of the present disclosure provide a liquid crystal antenna and a manufacturing method of the liquid crystal antenna. As shown in FIG. 2 to FIG. 13, the liquid crystal antenna includes a first substrate 10, a second substrate 11, a plurality of first conductive parts 12, a plurality of second conductive parts 13, a third substrate 14, a plurality of third conductive parts 15, a liquid crystal layer 16, and a frame adhesive 17. The first substrate 10 is oppositely arranged to the second substrate 11. The plurality of first conductive parts 12 is located over one side of the first substrate 10 adjacent to the second substrate 11. The plurality of second conductive parts 13 is located over one side of the second substrate 11 adjacent to the first substrate 10. The third substrate 14 is located over one side of the second substrate 11 away from the first substrate 10, at least one side surface of the second substrate 11, and one side of the second substrate 11 adjacent to the first substrate 10. The third substrate can completely cover one surface of the second substrate 11 away from the first substrate 10, or may partially cover the surface of the second substrate 11 away from the first substrate 10. The third substrate can be located on one side of the second substrate 11 (as shown in FIG. 2), or can be located over both sides of the second substrate 11 (as shown in FIG. 5). The third substrate 14 can completely cover one surface of the second substrate 11 adjacent to the first substrate 10 (as shown in FIG. 3), or can partially cover the surface of the second substrate 11 adjacent to the first substrate 10 (as shown in FIG. 5). The third substrate located over an upper surface, a lower surface, and a side surface of the second substrate 11 may form a bending structure (not shown in the figure), and the bending structure (not shown in the figure) can make the third substrate 14 and the second substrate 11 bound more firmly, and can also prevent water vapor penetrating from one side into a position between the second substrate 11 and the third substrate 14 which will affect antenna performance. The plurality of third conductive parts 15 is located over the side of the third substrate 14 away from the second substrate 11. The frame adhesive 17 is located between the first substrate 10 and the second substrate 11, and the frame adhesive 17 forms an accommodation space together with the first substrate 10 and the second substrate 11. The liquid crystal layer 16 is located in the accommodation space, and the third substrate 14 is a flexible substrate. In one embodiment, the third substrate 14 is made of a flexible material and is located over one surface and one side surface of the second substrate 11. The second substrate 11 supports the third substrate 14, which can improve the stability of the third substrate 14.

In some embodiments, the third substrate of the liquid crystal antenna is made of flexible material. The flexible material can be converted into a very thin third substrate, or the thickness of the third substrate in the liquid crystal antenna can be very small, thereby reducing the coupling loss. In this way, the radiation performance of the liquid crystal antenna can be improved and integration level of the liquid crystal antenna can be improved. The technical issue of low radiation performance of the liquid crystal antenna caused by the third substrate is addressed.

In some embodiments, the third substrate surrounds the upper surface, the lower surface, and the side surface of the second substrate. In the actual manufacturing process, the third substrate can be formed by only one coating process followed by bending.

A material of the third substrate includes PI and/or PET. Since PI and PET have excellent high-temperature stability, they can remain stable in a high-temperature environment and have a low dielectric constant, which can further reduce antenna loss. The thickness of the third substrate may range from 3 μm to 10 μm. Since the thickness in the present disclosure is thinner than a thickness in existing technical solutions, antenna loss can be further reduced.

In order to increase an area of the third substrate attached to the surface of the second substrate adjacent to the first substrate and further enhance the structural stability of the connection between the third substrate and the second substrate, in some embodiments, as shown in FIG. 3, the third substrate 14 includes sequentially connected a first part 141, a second part 142, and a third part 143. The first part 141 is located over the side of the second substrate 11 away from the first substrate 10, that is, the first part 141 is located over the surface of the second substrate 11 away from the first substrate 10, and the second part 142 is located over the side of a first side surface of the second substrate 11, that is, the second part 142 is located over the surface of the first side surface of the second substrate 11. The third part 143 is located over an entire surface of the second substrate 11 adjacent to the first substrate 10. The second conductive part 13 is located over the surface of the third part 143 adjacent to the first substrate 10. The third conductive part 15 is located on the surface of the first part 141 away from the second substrate 11. The plurality of the first conductive parts 12 is located over the side of the first substrate 10 adjacent to the second substrate 11, that is, the plurality of the first conductive parts 12 is located over the side of the first substrate 10 adjacent to the second substrate 11.

In practical applications, the third substrate completely covers the upper surface, the lower surface, and one side surface of the second substrate. In the actual manufacturing process, the third substrate can be formed by only performing one coating process and then bending.

Figure 4:
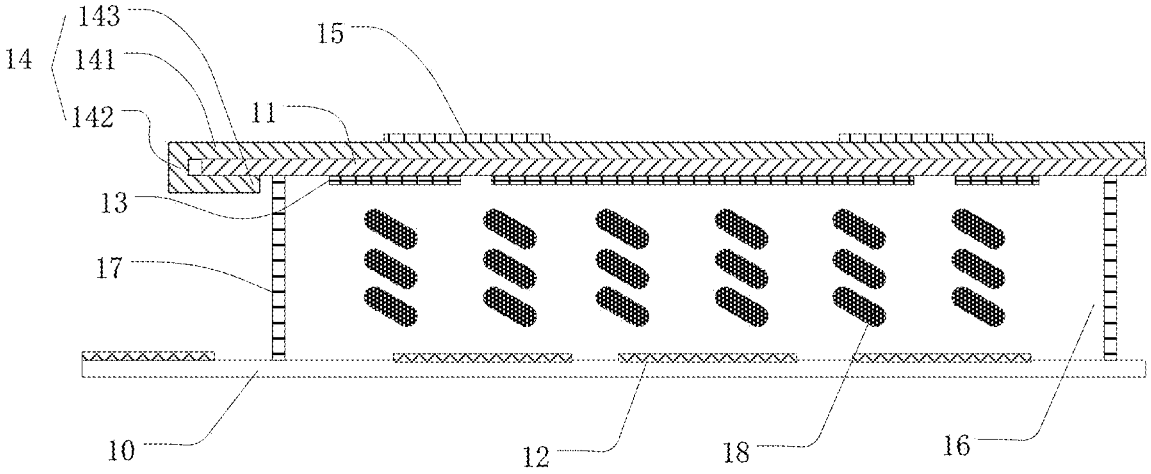
FIG. 4 illustrates a schematic structural diagram of another exemplary liquid crystal antenna according to one embodiment of the present disclosure.
Figure 5:
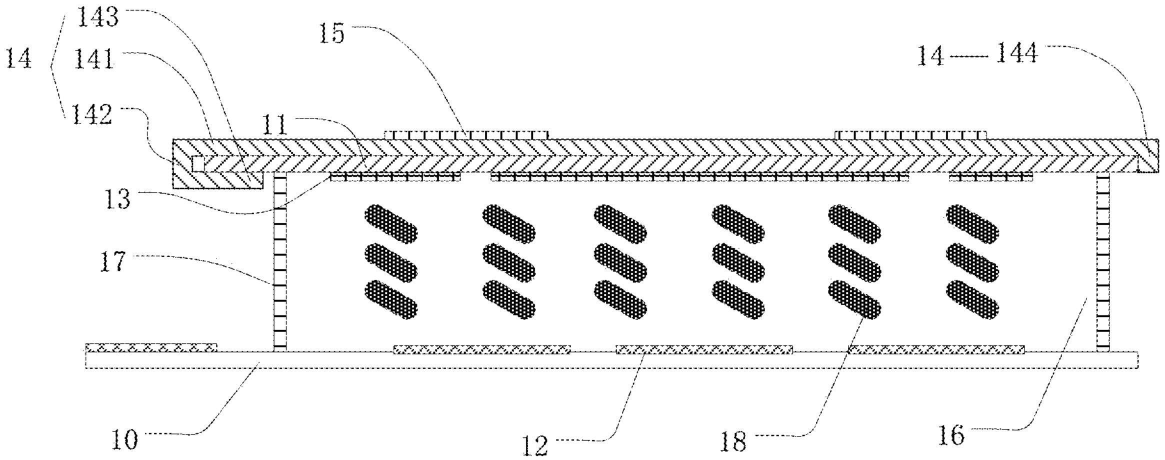
FIG. 5 illustrates a schematic structural diagram of another exemplary liquid crystal antenna according to one embodiment of the present disclosure.

In some optional embodiments, as shown in FIG. 4, the third substrate includes sequentially connected the first part 141, the second part 142, and the third part 143. The first part 141 is located over the side of the second substrate 11 away from the first substrate 10, or the first part 141 is located over the surface of the second substrate 11 away from the first substrate 10. The second part 142 is located over the first side surface of the second substrate 11, that is, the second part 142 is located over the surface of the first side surface of the second substrate 11, the third part 143 is located over a portion of the surface of the second substrate 11 adjacent to the first substrate 10. The second conductive part 13 is located over the surface of the second substrate 11 adjacent to the first substrate 10. An orthographic projection of the third part 143 over the second substrate 11 does not overlap with an orthographic projection of the second conductive part 13 on the second substrate 11, that is, the third part 143 of the third substrate 14 only covers a portion of the surface of the second substrate 11 adjacent to the first substrate 10, and is not located over a surface of the second conductive part 13. Therefore, the distance between the first conductive part 12 and the second conductive part 13 can be reduced, reducing the loss of the antenna, thereby further reducing the radiation performance of the liquid crystal antenna. The third conductive part 15 is located on the surface of the first part 141 away from the second substrate 11.

More specifically, the third part 143 is located on an outer periphery of a frame adhesive 17, as shown in FIG. 4, so that it can only cover a portion of the surface of the second substrate adjacent to the first substrate.

In practical applications, the third substrate can be formed by a coated ultra-thin PI, and the thickness of the third substrate and the thickness of the second substrate are much smaller than that of a conventional process. For example, in an existing process, the thickness of the second substrate is 0.5 mm, the thickness of the third substrate is 0.5 mm, and a total thickness of the third substrate and the second substrate is 1 mm. After using a flexible third substrate process, the thickness of the second substrate is 0.5 mm, the thickness of the third substrate is 0.01 mm (single layer), and the total thickness of the third substrate and the second substrate is 0.51 mm. From the perspective of the liquid crystal antenna performance, the thickness of a regular third substrate and a regular second substrate is ≥0.25 mm. If this condition is met, thinner third substrate and second substrate lead to a less antenna loss and a better performance. The impact of a laminating glue (such as OCA glue/acrylic glue, etc.) on the third substrate and the second substrate on an overall performance is almost negligible. A thickness of the dielectric interlayer has a significantly impact on the performance. Therefore, after using the flexible third substrate process, the total thickness of the third substrate and the second substrate is 45% thinner compared to the total thickness made by the existing process, and the antenna performance can be improved at the same time.

In order to increase the area of the third substrate attached to one side of the second substrate and further improve the firmness of the third substrate, in some embodiments, as shown in FIG. 5, the third substrate 14 further includes a fourth part 144. The fourth part 144 connects to the first part 141, and the fourth part 144 is located over a second side surface of the second substrate 11, that is, the fourth part 144 is located on one surface of the second side surface of the second substrate 11. The second side surface is opposite to the first side surface. In practical applications, the fourth part 144 does not contact the second conductive part 13. The fourth part 144 contacts the second substrate 11, which can enhance the firmness of the third substrate 14 and further increase the integration level of the device.

Specifically, the fourth part and the first part of the third substrate form another bending structure that confines the third substrate around the second substrate and increases an adhesion area between the second substrate and the third substrate. Thus, the third substrate can be better integrated with the second substrate. In addition, the liquid crystal antenna also includes a marking structure (not shown in the figure). The marking structure is used for alignment when bending the flexible material layer of the third substrate. The marking structure may be a cross-shaped or a T-shaped. The marking structure is located on one surface of the second part of the third substrate adjacent to the second substrate and one surface of the fourth part adjacent to the second substrate.

Figure 6:
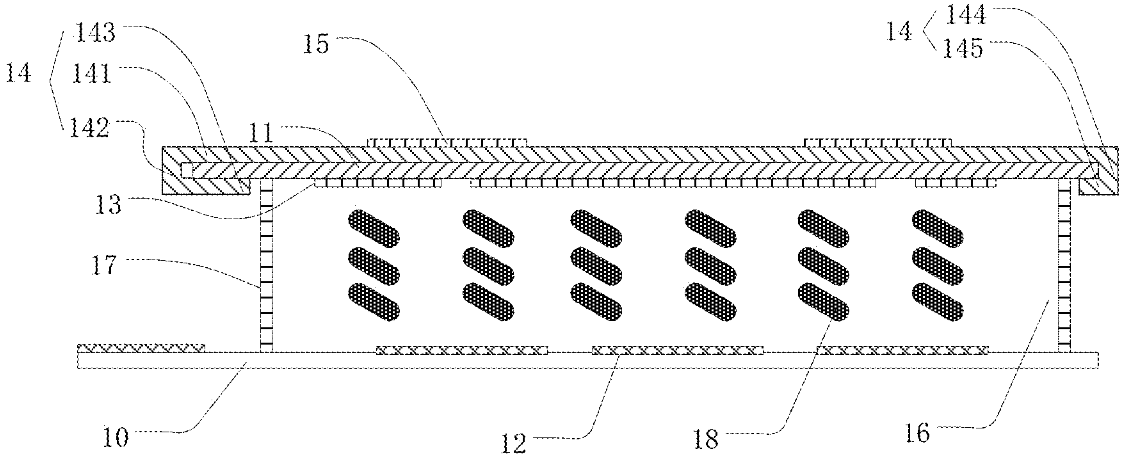
FIG. 6 illustrates a schematic structural diagram of another exemplary liquid crystal antenna according to one embodiment of the present disclosure.

In some optional embodiments, as shown in FIG. 6, when the third part 143 is located over a portion of the surface of the second substrate 11 adjacent to the first substrate 10, the third substrate 14 further includes a fifth part 145. The fifth part 145 connects to the fourth part 144, and the fifth part 145 is located on the side of the second substrate 11 adjacent to the first substrate 10, that is, the fifth part 145 is located on the surface of the second substrate 11 adjacent to the first substrate 10. The first part, the fourth part, and the fifth part form a bending structure. Since the adhesion area of the third substrate to the second substrate is further increased, the bending structure can better confine the third substrate to the surrounding area of the second substrate, further facilitating the integration of the third substrate and the second substrate.

Furthermore, as shown in FIG. 6, when the fifth part 145 is located over a portion of the surface of the second substrate 11 adjacent to the first substrate 10, the third substrate 14 does not contact the frame adhesive 17.

Figure 7:
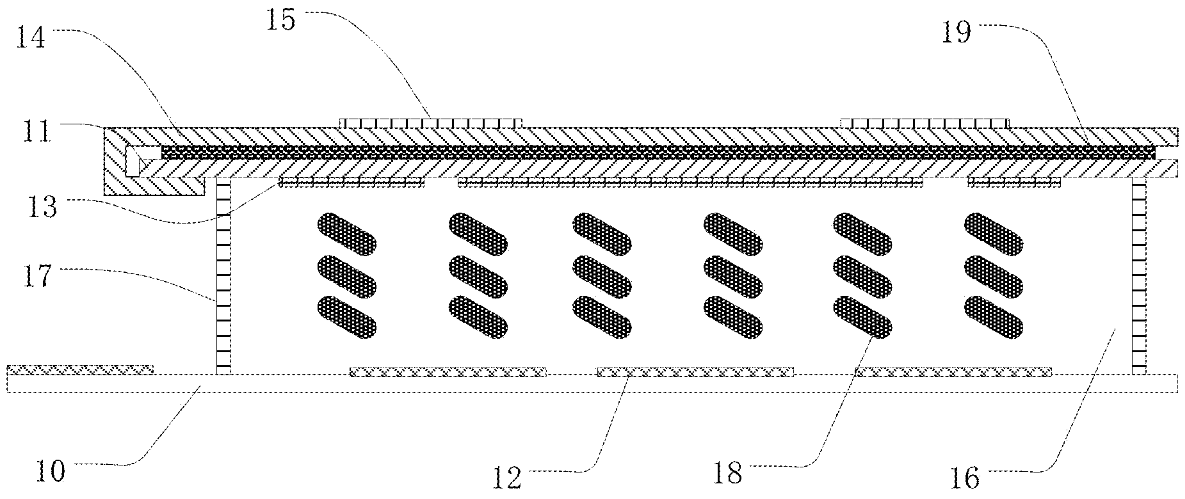
FIG. 7 illustrates a schematic structural diagram of another exemplary liquid crystal antenna according to one embodiment of the present disclosure.

In order to further improve the adhesion between the third substrate and the second substrate and prevent the third substrate from shifting, in an embodiment of the present disclosure, as shown in FIG. 7, the liquid crystal antenna also includes a bonding adhesive layer 19. The bonding adhesive layer 19 is located between the second substrate 11 and the third substrate 14.

Specifically, when the third part is located over a portion of the surface of the second substrate adjacent to the first substrate, the bonding adhesive layer is located between the second substrate and the third part. Since the third part has a larger surface area, the adhesion between the second substrate and the third substrate can be further enhanced.

Figure 8:
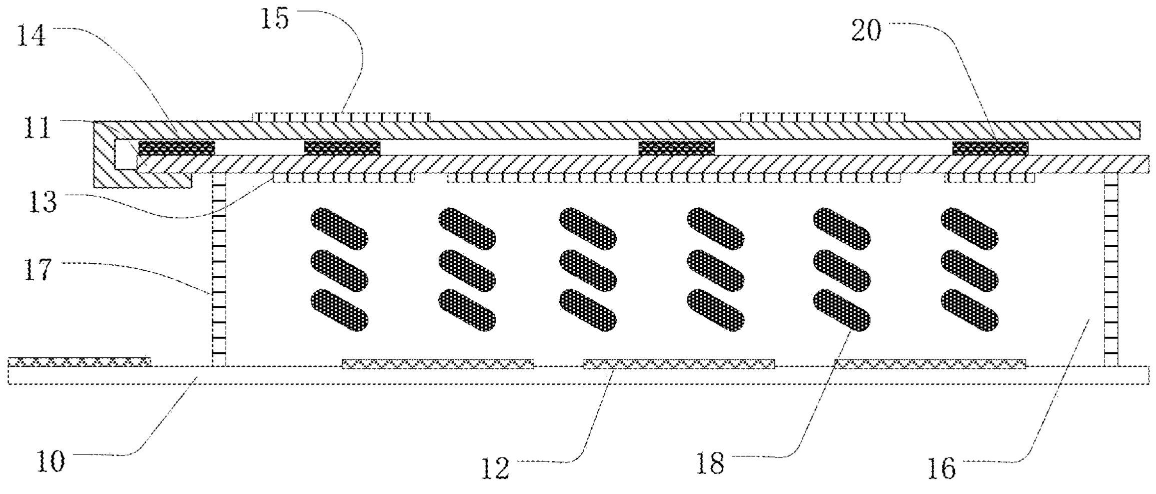
FIG. 8 illustrates a schematic structural diagram of another exemplary liquid crystal antenna according to one embodiment of the present disclosure.

In order to further reduce the consumption of the bonding adhesive layer and reduce the cost, in some embodiments, as shown in FIG. 8, the bonding adhesive layer 19 includes a plurality of spaced adhesive parts 20. When the bonding adhesive layer includes a plurality of spaced bonding adhesive parts 20, there is no need to arrange the bonding adhesive layer to fill an entire space between the second substrate and the third substrate. The surface of the third substrate can also be bound on the second substrate, thereby reducing the consumption of the bonding adhesive layer and reducing the cost. A plurality of intervals between the plurality of spaced bonding adhesive parts 20 may be equal or different.

In some embodiments, as shown in FIG. 8, an orthographic projection of an interval between any two adjacent bonding adhesive parts 20 over the second substrate 11 covers an orthographic projection of an interval between any two adjacent second conductive parts 13 over the second substrate 11. When the liquid crystal antenna is working and a signal is transmitted from an interval of the second conductive part 13 to the third conductive part 15, it does not need to pass through the bonding adhesive part 20. Therefore, a dielectric constant of the medium through which the signal is transmitted becomes smaller, thereby further enhancing the radiation performance of the liquid crystal antenna.

To further increase adhesion between the second substrate and the third substrate, in some embodiments, the bonding adhesive layer 19 is also located on at least one side of the second substrate.

Figure 9:
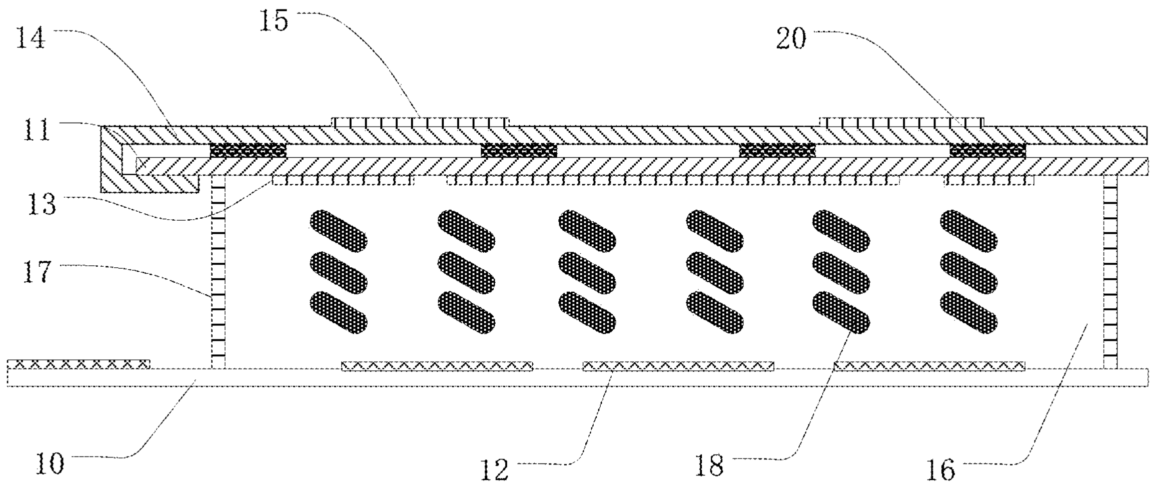
FIG. 9 illustrates a schematic structural diagram of another exemplary liquid crystal antenna according to one embodiment of the present disclosure.
Figure 10:
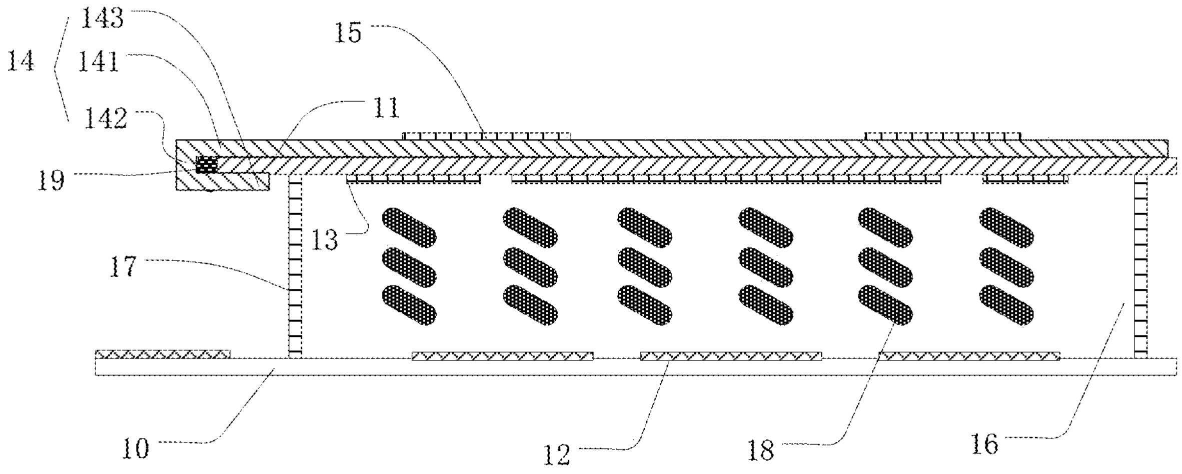
FIG. 10 illustrates a schematic structural diagram of another exemplary liquid crystal antenna according to one embodiment of the present disclosure.
Figure 11:
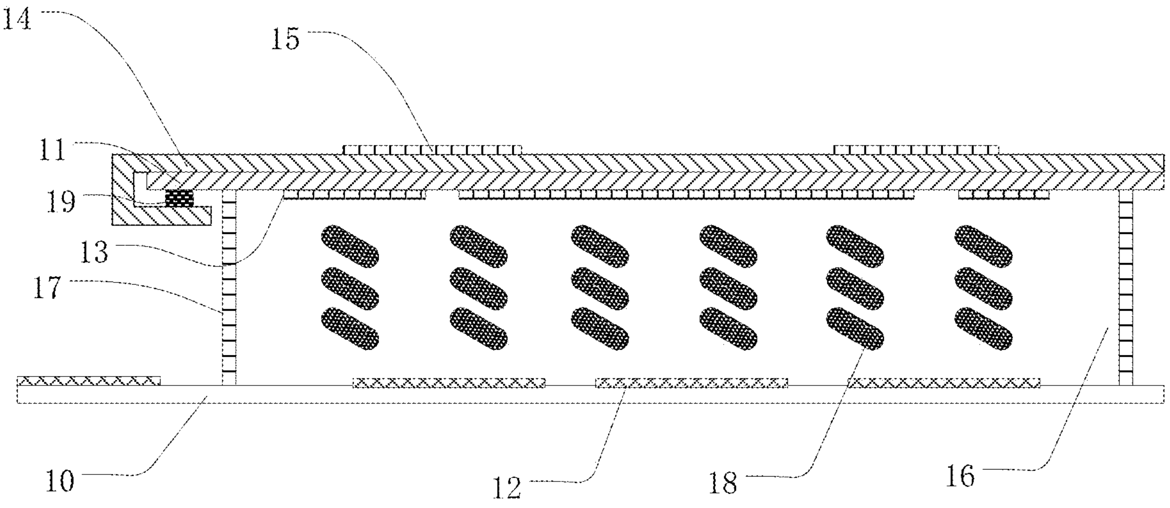
FIG. 11 illustrates a schematic structural diagram of another exemplary liquid crystal antenna according to one embodiment of the present disclosure.
Figure 12:
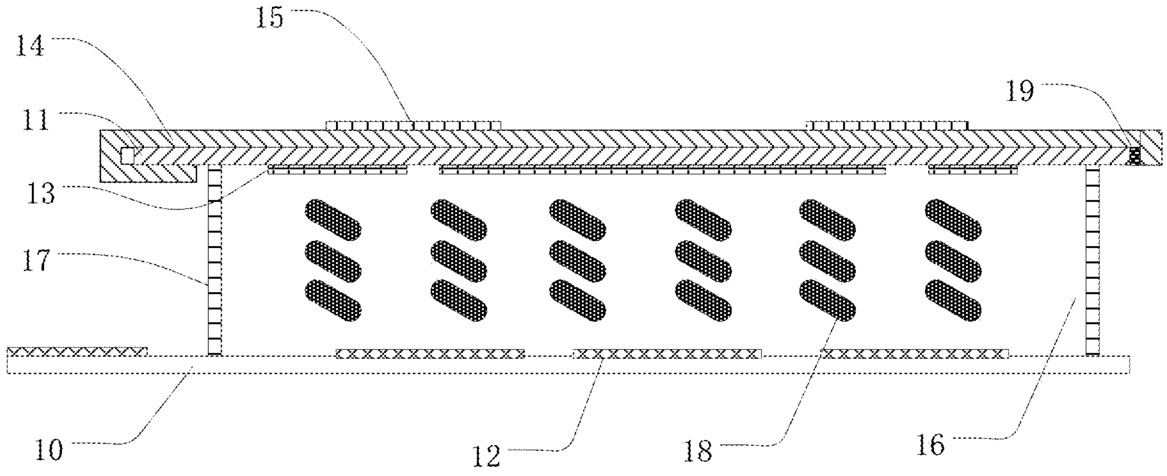
FIG. 12 illustrates a schematic structural diagram of another exemplary liquid crystal antenna according to one embodiment of the present disclosure.
Figure 13:
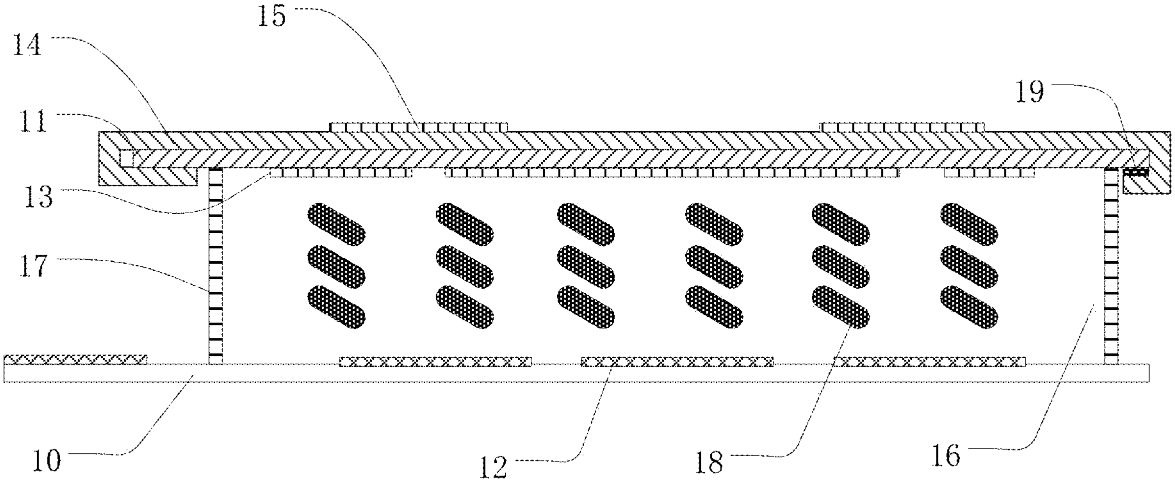
FIG. 13 illustrates a schematic structural diagram of another exemplary liquid crystal antenna according to one embodiment of the present disclosure.

Specifically, as shown in FIG. 10, when the third substrate 14 has the second part 142, the bonding adhesive layer 19 is located between the second substrate 11 and the second part 142, which can enhance the adhesion between the third substrate 14 and the second substrate 11 and make the third substrate 14 more robust. At the same time, since the bonding adhesive layer 19 is on the side, compared to arranging the bonding adhesive layer between the second substrate 11 and the third substrate 14 shown in FIG. 9, a distance between the second substrate 11 and the third substrate 14 is reduced, that is, a distance between the first conductive part 12 and the third conductive part 15 is reduced, thereby reducing antenna loss and enhancing the radiation performance of the liquid crystal antenna. As shown in FIG. 11, when the third substrate 14 has the third part 143, the bonding adhesive layer 19 is located between the second substrate 11 and the third part 143. This can enhance an adhesion between the second substrate 11 and the third substrate 14, at the same time, the thickness of the second substrate 11 and the thickness of the third substrate 14 do not increase. As shown in FIG. 12, when the third substrate 14 has a fourth part 144, the bonding adhesive layer 19 is located between the second substrate 11 and the fourth part 144. Through the bonding adhesive layer 19, the fourth part 144 of the third substrate 14 is bound to the second substrate 11, further enhancing the adhesion between the third substrate 14 and the second substrate 11, so that the third substrate 14 is firmly confined on the second substrate 11. As shown in FIG. 13, when the third substrate 14 has a fifth part 145, the bonding adhesive layer 19 is located between the second substrate 11 and the fifth part 145. Through the bonding adhesive layer 19, the fifth part 145 of the third substrate 14 is bonded to the second substrate 11, which can further enhance the adhesion between the third substrate 14 and the second substrate 11, so that the third substrate 14 is firmly confined to the second substrate 11.

In order to further improve a heat dissipation capability of a display device, in some embodiments, a material of the third substrate includes PI or PET. Because PI or PET has excellent high-temperature stability, it can maintain stable and low dielectric constant in a high-temperature environment, which can further reduce antenna loss. As shown in FIG. 9, an orthographic projection of an interval between any two adjacent second conductive parts 13 on the second substrate 11 does not overlap with an orthographic projection of an interval between any two adjacent third conductive parts 15 on the second substrate 11. When the liquid crystal antenna is working and the signal is transmitted from the interval between the two adjacent second conductive parts 13 to the third conductive part 15, it does not need to pass through the bonding adhesive part 20, so the dielectric constant of the medium through which the signal is transmitted becomes smaller, thereby further enhancing the radiation performance of the liquid crystal antenna.

In some embodiments, the thickness of the third substrate ranges from 3 μm to 10 μm. Since the thickness is thinner than the provided substrate, antenna loss can be further reduced, improving the antenna performance.

In order to further improve the radiation performance of the liquid crystal antenna, in some embodiments, a material property of the third substrate is not greater than a material property of glass, and the material property includes dielectric constant and loss tangent. The material parameter can also be surface roughness. In practical applications, although the panel process of a glass substrate can produce a high-precision metal film layer, a high-precision cell thickness, and a high-precision alignment module. However, if the third substrate is a glass substrate, the thickness of the third substrate will be relatively large and the dielectric constant and loss tangent will be high, which will lead to a radiation performance reduction of the liquid crystal antenna.

Figure 14:
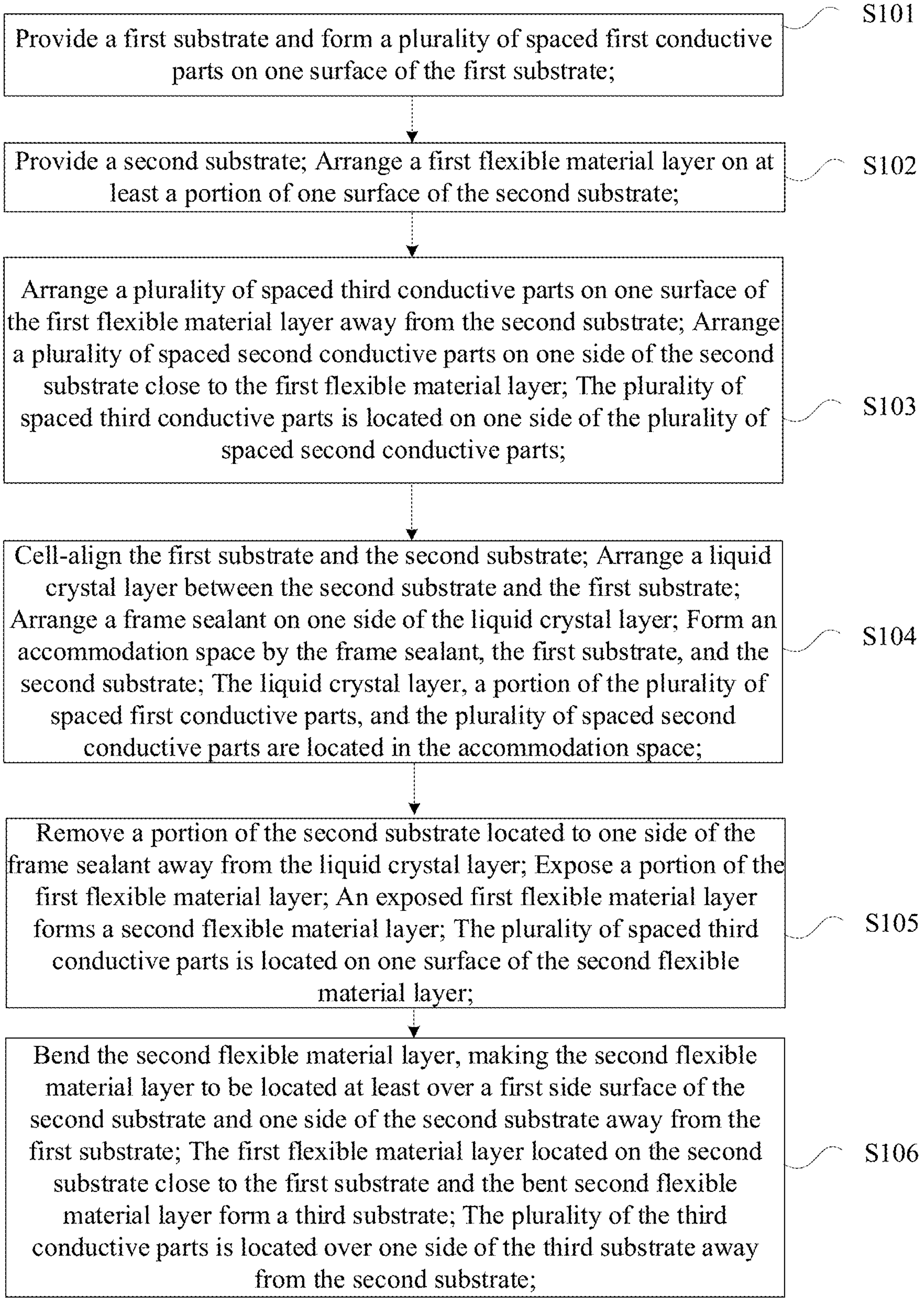
FIG. 14 illustrates a schematic flow chart of a method of forming a liquid crystal antenna according to one embodiment of the present disclosure.
Figure 15:
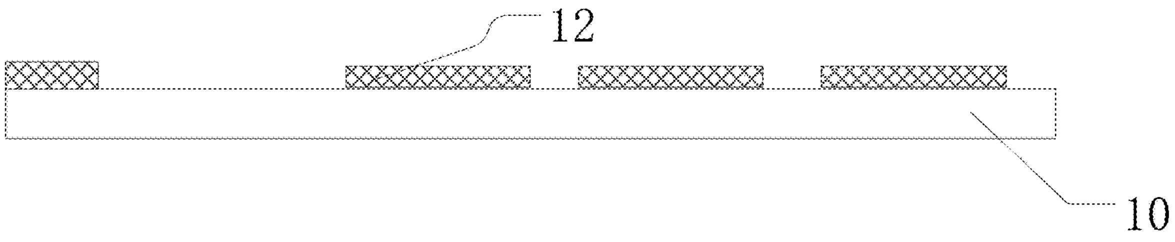
FIG. 15 illustrates a schematic structural diagram including a first substrate and a first conductive part according to one embodiment of the present disclosure.

According to an embodiment of the present application, a manufacturing method of the liquid crystal antenna is also provided, as shown in FIG. 14, including the following steps:

Step S101, provide a first substrate 10. The material of the first substrate 10 can be glass, and form a plurality of spaced first conductive parts 12 on one surface of the first substrate 10 to obtain a structure shown in FIG. 15. Among them, the plurality of spaced first conductive parts 12 can be a delay line metal layer, and the electrode material can be a metal such as Cu. The ground electrode layer can be formed using PVD, electroplating, and other processes.

Figure 16:
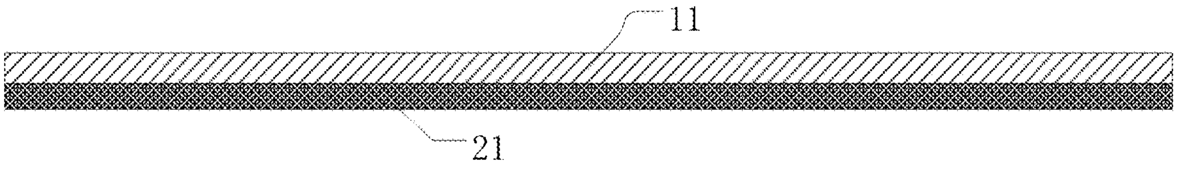
FIG. 16 illustrates a schematic structural diagram including a second substrate and a first flexible material layer according to one embodiment of the present disclosure.
Figure 17:
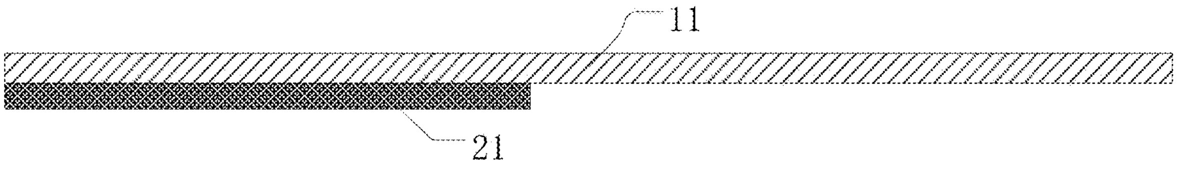
FIG. 17 illustrates a schematic structural diagram including a second substrate and a first flexible material layer according to one embodiment of the present disclosure.

Step S102, provide a second substrate 11. The material of the second substrate 11 can be glass. A first flexible material layer 21 is arranged over at least a portion of one surface of the second substrate 11. When the first flexible material layer 21 is provided over an entire surface of the second substrate 11, a structure shown in FIG. 16 can be obtained. When the first flexible material layer 21 is provided on a portion of the surface of the second substrate 11, the structure shown in FIG. 17 can be obtained.

Figure 18:
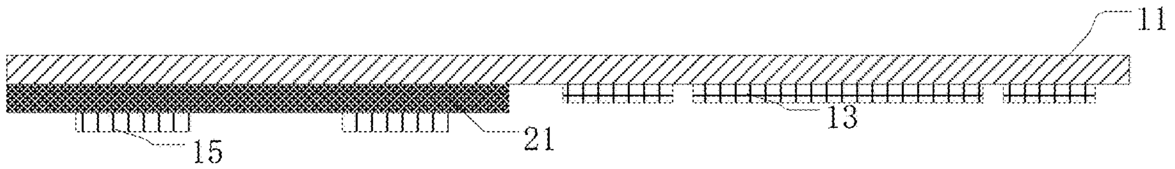
FIG. 18 illustrates a schematic structural diagram of forming a second conductive part and a third conductive part based on the structure shown in FIG. 17.

Step S103, arrange a plurality of spaced third conductive parts 15 over one surface of the first flexible material layer 21 away from the second substrate 11. The third conductive part 15 can be a radiator electrode, and the electrode material is a metal such as Cu. The thickness of the third conductive part can be 2 μm, and a plurality of spaced second conductive parts 13 is arranged on one side of the second substrate 11 adjacent to the first flexible material layer 21, that is the plurality of spaced second conductive parts 13 is arranged on one surface of the material layer 21. The plurality of spaced second conductive parts 13 may be a ground electrode layer, and the metal material may be Cu, ITO, etc. The plurality of spaced third conductive parts 15 is located on one side of the plurality of spaced second conductive parts 13 to form a structure shown in FIG. 18.

Figure 19:
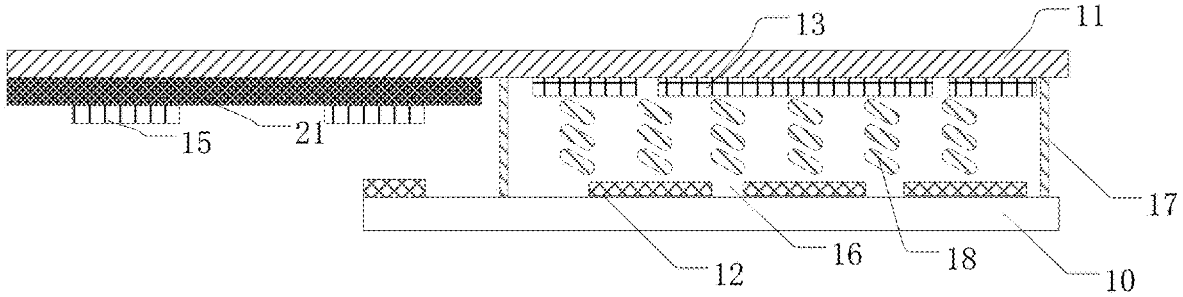
FIG. 19 illustrates a schematic structural diagram of forming a liquid crystal layer and a frame adhesive based on the structure shown in FIG. 15 and the structure shown in FIG. 18.

Step S104, cell-align the first substrate 10 and the second substrate 11, and a liquid crystal layer 16 is arranged between the second substrate 11 and the first substrate 10. In practical applications, applying a driving voltage signal to the first conductive part 12 and the second conductive part 13, respectively can form an electric field between the first conductive part 12 and the second conductive part 13. The electric field can drive a liquid crystal molecule 18 in the liquid crystal layer 16 to deflect, thereby changing the dielectric constant of the liquid crystal layer 16. A frame adhesive 17 is arranged on one side of the liquid crystal layer 16. An accommodation space is formed by the frame adhesive 17, the first substrate 10, and the second substrate 11. The liquid crystal layer 16, a portion of the plurality of spaced first conductive parts 12, and the plurality of spaced second conductive parts 13 are located in the accommodation space, resulting in a structure shown in FIG. 19.

Figure 20:
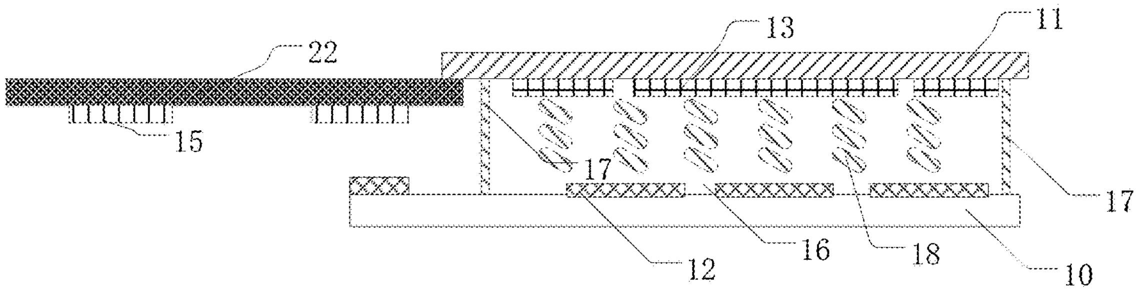
FIG. 20 illustrates a schematic structural diagram of removing a portion of the second substrate based on the structure shown in FIG. 19.
Figure 21:
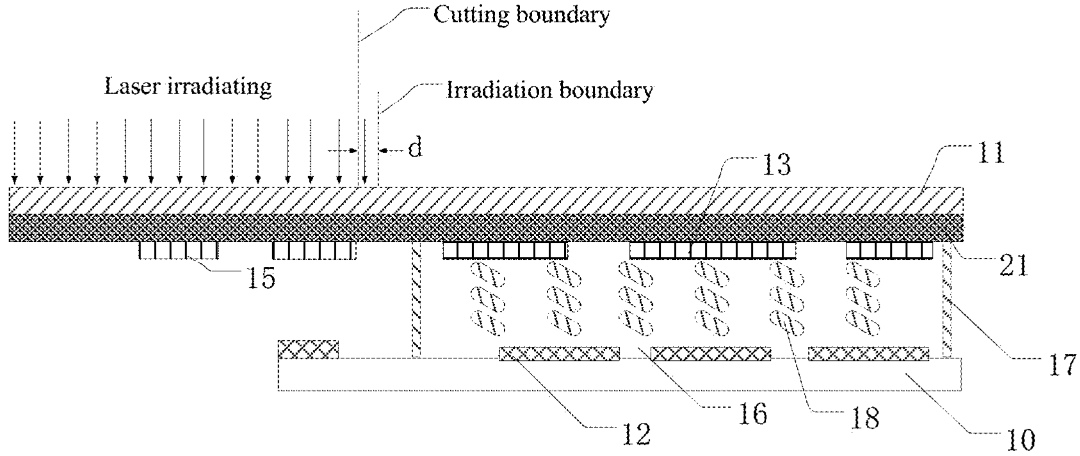
FIG. 21 illustrates a schematic structural diagram of removing a portion of a second substrate according to one embodiment of the present disclosure.
Figure 22:
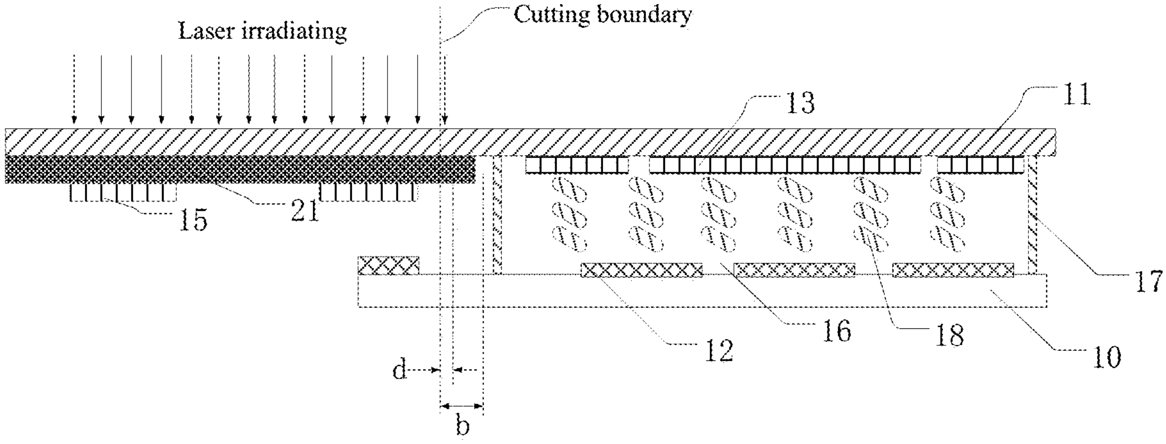
FIG. 22 illustrates a schematic structural diagram of removing a portion of a second substrate according to one embodiment of the present disclosure.

Step S105, remove a portion of the second substrate located to one side of the frame adhesive away from the liquid crystal layer to obtain a structure shown in FIG. 20. When removing the portion of the second substrate, a cutter wheel can be used to cut the second substrate to form a cutting area. The cutting accuracy is ±0.2 mm. When irradiating the portion of the second substrate with laser and peel off the second substrate in the cutting area, because of limitations of cutting technology, a distance d between a cutting boundary of the cutting area and a laser irradiation boundary is ≥0.2 mm, that is, a laser irradiation area is larger than an area corresponding to the cutting part, ensuring an entire structure formed by cutting experience the laser irradiation. A projection of the laser irradiation area on the flexible material layer covers a projection of the plurality of spaced third conductive parts on the flexible material layer, as shown in FIG. 21 and FIG. 22. A portion of the first flexible material layer is exposed. An exposed first flexible material layer forms a second flexible material layer, and the plurality of spaced third conductive parts 15 is located on one surface of the second flexible material layer.

Step S106, bend the second flexible material layer 22. In practical applications, an alignment structure is arranged on the second flexible material layer 22 for alignment when bending the second flexible material layer 22. Thus, the second flexible material layer 22 is located at least over a first side surface of the second substrate 11 and one side of the second substrate 11 away from the first substrate 10. That means after achieving an alignment of the second flexible material layer and the first side surface of the second substrate, an alignment of the second flexible material layer and another side surface of the second substrate is further achieved. The first flexible material layer is located on the second substrate 11 adjacent to the first substrate 10 and the bent second flexible material layer forms a third substrate 14, the structure shown in FIG. 2. A material of the third substrate 14 includes PI or PET. Since PI or PET has excellent high-temperature stability, it can remain stable and a low dielectric constant in high-temperature environments, reducing antenna loss. The thickness of the third substrate 14 ranges from 3 μm to 10 μm. Since the thickness is thinner than the provided substrate, the antenna loss can be reduced. The dielectric constant, loss tangent, and surface roughness of the third substrate 14 are not greater than those of glass. The plurality of the third conductive parts 15 is located over one side of the third substrate 14 away from the second substrate 11.

In various embodiments of the present disclosure, the thickness of the third substrate formed by coating a flexible material is thin, which can weaken the surface wave of an antenna. The power of the surface wave can be radiated outside the space, which is beneficial to reducing the loss of the surface wave of an antenna. Due to the small thickness of the second substrate, a coupling loss between the third conductive part and the first conductive part is reduced, improving a transmission performance of the liquid crystal antenna. In addition, reducing the thickness of the second substrate in the liquid crystal antenna can also achieve a flexible matching of a substrate thickness with an antenna design.

Figure 23:
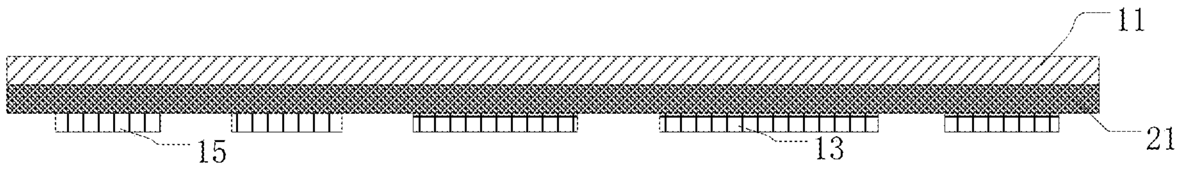
FIG. 23 illustrates a schematic structural diagram of forming a second conductive part and a third conductive part based on the structure shown in FIG. 16.

In some embodiments, the step S103 includes the following steps:

Step S1031, when the first flexible material layer 21 is provided over the surface of the second substrate 11, the plurality of spaced third conductive parts 15 and the plurality of spaced second conductive parts 13 are formed over the surface of the first flexible material layer 21 away from the second substrate 11 to obtain a structure shown in FIG. 23. The first flexible material layer 21 is grown over an entire lower surface of the second substrate 11, which can further enhance the adhesion between the first flexible material layer 21 and the second substrate 11 to form a structure shown in FIG. 21.

Step S1032, when the first flexible material layer 21 is disposed over a portion of the surface of the second substrate 11, the plurality of spaced third conductive parts 15 is formed over the surface of the first flexible material layer 21 away from the second substrate 11. The plurality of the spaced second conductive parts 13 is formed on the surface of the second substrate 11 adjacent to the plurality of spaced third conductive parts 15 to obtain a structure shown in FIG. 18. This further reduces the distance from a second conductive part to a third conductive part, reducing the loss of antenna surface wave.

To further improve the transmission performance of the liquid crystal antenna, in some embodiments, prior to step S106, it also includes:

Step S100, thin the second substrate to a predetermined thickness. By thinning the second substrate, the antenna surface wave is further weakened, the loss of the antenna surface wave is reduced. The coupling loss between the third conductive part and the first conductive part is further reduced, thereby further improving the transmission performance of the liquid crystal antenna. In addition, reducing the thickness of the second substrate in the liquid crystal antenna can further flexibly match the thickness of the substrate required by antenna design.

Specifically, for example, the thickness of the second substrate prior to thinning is 0.5 mm, and the thickness of the second substrate after thinning is 0.25 mm. After using the flexible third substrate process, when the third part of the third substrate covers an entire surface of the second substrate, the thickness of the second substrate is 0.25 mm, the thickness of the third substrate is 0.01 mm (double layers), the thickness of the bonding adhesive layer is 0.37 mm, and the total thickness of the dielectric interlayer (the second substrate, the third substrate, and the bonding adhesive layer) is 0.37 mm. The total thickness of the dielectric interlayer is 66% thinner than that of the existing process, further improving the antenna performance. When the third part of the third substrate covers a portion of the surface of the second substrate, the thickness of the second substrate is 0.25 mm, the thickness of the third substrate is 0.01 mm (single layer), the thickness of the bonding adhesive layer is 0.1 mm, and the total thickness of the dielectric interlayer is 0.37 mm. The total thickness of the dielectric interlayer is 67% thinner than that of the existing process, further improving the antenna performance.

In order to further enable the first flexible material layer to better adhere to the second substrate, in some embodiments, step S102 further includes: after providing the second substrate, prior to disposing the first flexible material layer on at least a portion of the surface of the second substrate, a bonding adhesive layer is provided on at least a portion of the surface of the second substrate. The bonding adhesive layer is used to bound an upper substrate and PI. It is non-sticky after laser irradiation and is conducive to the peeling of the glass. The material of the bonding adhesive layer can be a PI glue group.

In some embodiments, after step S105 and prior to step S106, it also includes:

Step S1051, form a bonding adhesive layer on at least a portion of the remaining surface of the second substrate away from the first flexible material layer. The bonding adhesive layer may include a plurality of spaced bonding adhesive parts. The material of the adhesive layer on the upper surface of the second substrate can be an OCA glue or an acrylic glue, and the thickness of the bonding adhesive layer is ≤0.1 mm.

Step S1052, form a bonding adhesive layer over at least one side of the second substrate. The adhesive layer over the side of the second substrate may be silica gel, which can protect the third substrate from being scratched or broken when it is bent. A bonding adhesive layer is formed over a side surface to ensure a good adhesion between the flexible material and the second substrate without increasing the thickness of the cell, thereby reducing antenna loss and improving the radiation performance of the liquid crystal antenna.

Figure 24:
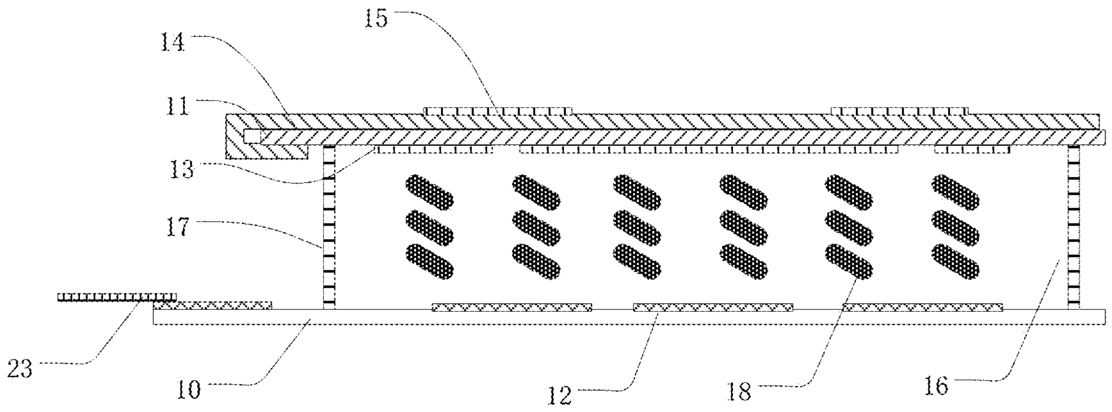
FIG. 24 illustrates a schematic structural diagram of forming an FPC based on the structure shown in FIG. 2.

In a specific embodiment, the above step S1051 includes:

When the first flexible material layer is disposed over a portion of the surface of the second substrate 11, the second flexible material layer is bent so that an orthographic projection of the second flexible material layer over the second substrate 11 covers the first side surface of the second substrate, the surface of the second substrate 11 away from the first substrate 10, the second side surface of the second substrate 11, a portion of the surface of the second substrate 11 adjacent to the first substrate 10. The second side surface and the first side surface are oppositely arranged, and a structure shown in FIG. 12 is obtained. The first flexible material layer covering another side surface of the second substrate and the flexible material layer over the surface of the second substrate away from the first substrate form a bending structure. The bending structure confines the third substrate to a surrounding area of the second substrate, making the third substrate better adhere to the second substrate. When the third part of the third substrate covers a portion of the surface of the second substrate, in order to prevent the flexible material from entering the cell and affecting the thickness of the cell, a certain distance c needs to be reserved between a boundary of the flexible material layer and the frame adhesive. Considering the frame adhesive tolerance and PI coating tolerance, $c \geq 0.3$ mm. After bending the second flexible material layer, FPC is bound on the first conductive part to complete the production of the entire liquid crystal antenna module, obtaining a structure shown in FIG. 24. The FPC is used to provide a bias voltage to a phase shifter.

From the above description, it can be seen that embodiments of the present disclosure achieve the following technical effective benefits:

As the third substrate of the liquid crystal antenna is made of a flexible material, an ultra-thin third substrate can be prepared, which can reduce the thickness of the third substrate and further improve the radiation performance of the liquid crystal antenna, and enhance the integration level of the liquid crystal antenna. This addresses the technical issue of low radiation performance of a liquid crystal antenna having a third substrate.

In the manufacturing method of the liquid crystal antenna of the present disclosure, the thickness of the third substrate formed by coating the flexible material is thin, which can weaken the surface wave of the antenna, so that the surface wave power can be irradiated outside the space, which is beneficial to reducing the loss of the antenna surface wave. Since the thickness of the second substrate is small, the coupling loss between the third conductive part and the first conductive part can be reduced, thereby improving the transmission performance of the liquid crystal antenna. In addition, reducing the thickness of the second substrate in the liquid crystal antenna can also achieve a flexible matching of substrate thickness with the required antenna design.

The above descriptions are only preferred embodiments of the present disclosure and are not intended to limit the present disclosure. For those of ordinary skill in the art, the present disclosure may have various modifications and changes. Any modifications, equivalent replacements, improvements, etc. made within the spirit and principles of this disclosure shall be included in the protection scope of this disclosure.

What is claimed is:

1. A liquid crystal antenna, comprising a first substrate, a second substrate, a plurality of first conductive parts, a plurality of second conductive parts, a third substrate, a bonding adhesive layer that is located between the second substrate and the third substrate, a plurality of third conductive parts, a liquid crystal layer, and a frame adhesive, wherein the first substrate and the second substrate are oppositely arranged;

the plurality of first conductive parts is located over one side of the first substrate adjacent to the second substrate;

the plurality of second conductive parts is located over one side of the second substrate adjacent to the first substrate;

the third substrate is located over at least three different sides of the second substrate, including one side of the second substrate away from the first substrate, at least one side surface of the second substrate, and the side of the second substrate adjacent to the first substrate;

the plurality of third conductive parts is located over one side of the third substrate away from the second substrate;

the frame adhesive is located between the first substrate and the second substrate, and forms an accommodation space together with the first substrate and the second substrate;

the liquid crystal layer is located in the accommodation space; and the third substrate is a flexible substrate.

2. The liquid crystal antenna according to claim 1, wherein the third substrate comprises a first part, a second part, and a third part; the first part, the second part, and the third part are sequentially connected;

the first part is located over the side of the second substrate away from the first substrate;

the second part is located over a first side surface of the second substrate;

the third part is located over an entire surface of the second substrate adjacent to the first substrate;

a second conductive part of the plurality of second conductive parts is located over one surface of the third part adjacent to the first substrate; and a third conductive part of the plurality of third conductive parts is located over one surface of the first part away from the second substrate.

3. The liquid crystal antenna according to claim 2, wherein the third substrate further comprises a fourth part;

the fourth part connects the first part;

the fourth part is located over a second side surface of the second substrate; and the second side surface is opposite to the first side surface.

4. The liquid crystal antenna according to claim 3, wherein when the third part is located over a portion of one surface of the second substrate adjacent to the first substrate, the third substrate further comprises a fifth part;

the fifth part connects the fourth part; and the fifth part is located over the side of the second substrate adjacent to the first substrate.

5. The liquid crystal antenna according to claim 3, wherein when the third part is located over a portion of one surface of the second substrate adjacent to the first substrate, the third substrate does not contact the frame adhesive.

6. The liquid crystal antenna according to claim 3, further comprising a marking structure wherein the marking structure is located over one surface of the second part of the third substrate adjacent to the second substrate, and/or one surface of the fourth part adjacent to the second substrate.

7. The liquid crystal antenna according to claim 1, wherein the third substrate comprises a first part, a second part, and a third part; the first part, the second part, and the third part are sequentially connected;

the first part is located over the side of the second substrate away from the first substrate;

the second part is located over a first side surface of the second substrate;

the third part is located over a portion of one surface of the second substrate adjacent to the first substrate;

a second conductive part of the plurality of second conductive parts is located over the surface of the second substrate adjacent to the first substrate;

an orthographic projection of the third part on the second substrate does not overlap with an orthographic projection of the second conductive part on the second substrate; and a third conductive part of the plurality of third conductive parts is located over one surface of the first part away from the second substrate.

8. The liquid crystal antenna according to claim 7, wherein the third substrate further comprises a fourth part;

the fourth part connects the first part;

the fourth part is located over a second side surface of the second substrate; and the second side surface is opposite to the first side surface.

9. The liquid crystal antenna according to claim 1, wherein the bonding adhesive layer comprises a plurality of spaced bonding adhesive parts.

10. The liquid crystal antenna according to claim 9, wherein an orthographic projection of an interval between any two adjacent bonding adhesive parts over the second substrate covers an orthographic projection of an interval between any two adjacent second conductive parts over the second substrate.

11. The liquid crystal antenna according to claim 1, wherein the bonding adhesive layer is further located over at least one side surface of the second substrate.

12. The liquid crystal antenna according to claim 1, wherein a material of the third substrate comprises PI or PET.

13. The liquid crystal antenna according to claim 1, wherein a thickness of the third substrate ranges from 3 μm to 10 μm.

14. The liquid crystal antenna according to claim 1, wherein a material property of the third substrate is not greater than a material property of glass, and the material property comprises dielectric constant and loss tangent.

15. A liquid crystal antenna, comprising a first substrate, a second substrate, a plurality of first conductive parts, a plurality of second conductive parts, a third substrate, a plurality of third conductive parts, a liquid crystal layer, and a frame adhesive, wherein the first substrate and the second substrate are oppositely arranged;

the plurality of first conductive parts is located over one side of the first substrate adjacent to the second substrate;

the plurality of second conductive parts is located over one side of the second substrate adjacent to the first substrate;

the third substrate is located over: one side of the second substrate away from the first substrate, at least one side surface of the second substrate, and the side of the second substrate adjacent to the first substrate;

the plurality of third conductive parts is located over one side of the third substrate away from the second substrate;

the frame adhesive is located between the first substrate and the second substrate, and forms an accommodation space together with the first substrate and the second substrate;

the liquid crystal layer is located in the accommodation space;

the third substrate is a flexible substrate; and an orthographic projection of an interval between any two adjacent second conductive parts over the second substrate does not overlap with an orthographic projection of an interval between any two adjacent third conductive parts over the second substrate.

16. A method of forming a liquid crystal antenna, comprising:

providing a first substrate and forming a plurality of spaced first conductive parts over one surface of the first substrate;

providing a second substrate and arranging a first flexible material layer over at least a portion of one surface of the second substrate;

arranging a plurality of spaced third conductive parts over one surface of the first flexible material layer away from the second substrate; and arranging a plurality of spaced second conductive parts over one side of the second substrate adjacent to the first flexible material layer, wherein the plurality of spaced third conductive parts is located over one side of the plurality of spaced second conductive parts;

cell-aligning the first substrate and the second substrate; arranging a liquid crystal layer between the second substrate and the first substrate; arranging a frame adhesive over one side of the liquid crystal layer; and forming an accommodation space by the frame adhesive, the first substrate, and the second substrate, wherein the liquid crystal layer, a portion of the plurality of spaced first conductive parts, and the plurality of spaced second conductive parts are located in the accommodation space;

removing a portion of the second substrate located over one side of the frame adhesive away from the liquid crystal layer; and exposing a portion of the first flexible material layer, wherein an exposed first flexible material layer forms a second flexible material layer; and the plurality of spaced third conductive parts is located over one surface of the second flexible material layer; and bending the second flexible material layer, making the second flexible material layer be located at least over a first side surface of the second substrate and one side of the second substrate away from the first substrate, wherein the first flexible material layer is located over the second substrate adjacent to the first substrate and the bent second flexible material layer forms a third substrate; and the plurality of the third conductive parts is located over one side of the third substrate away from the second substrate.

17. The method according to claim 16, wherein arranging the plurality of spaced third conductive parts over the surface of the first flexible material layer away from the second substrate and arranging the plurality of spaced second conductive parts over the side of the second substrate adjacent to the first flexible material layer comprises:

when the first flexible material layer is located over one surface of the second substrate, forming the plurality of spaced third conductive parts and the plurality of spaced second conductive parts over the surface of the first flexible material layer away from the second substrate; and when the first flexible material layer is arranged over a portion of one surface of the second substrate, forming the plurality of spaced third conductive parts over the surface of the first flexible material layer away from the second substrate, and forming the plurality of spaced second conductive parts over one side of the second substrate adjacent to the plurality of spaced third conductive parts.

18. The method according to claim 16, further comprising thinning the second substrate to a predetermined thickness, prior to bending the second flexible material layer.

19. The method according to claim 16, wherein bending the second flexible material layer, and making the second flexible material layer to be located at least over the first side surface of the second substrate and the side of the second substrate away from the first substrate, comprise:

bending the second flexible material layer to make the second flexible material layer located: over the first side surface of the second substrate, the side of the second substrate away from the first substrate, and one second side surface of the second substrate; and the first side surface and the second side surface being oppositely arranged, and the method further comprises: bending the second flexible material layer, making an orthographic projection of the second flexible material layer over the second substrate at least cover one first side surface of a remaining second substrate and one surface of the second substrate away from the first substrate by performing:

when the first flexible material layer is arranged over a portion of one surface of the second substrate, bending the second flexible material layer to make an orthographic projection of the second flexible material layer over the second substrate covers: the first side surface of the second substrate, one surface of the second substrate away from the first substrate, the second side surface of the second substrate, and a portion of one surface of the second substrate away from the first substrate; and the first side surface and the second side surface being oppositely arranged.

* * * * *